United States Patent [19]
Beyne et al.

[11] Patent Number: 5,192,424
[45] Date of Patent: * Mar. 9, 1993

[54] FILTER IDENTIFICATION DEVICE

[75] Inventors: Patrick Beyne, Suresne; Georges Seon, Saint-Witz, both of France

[73] Assignee: ISP Investments Inc., Wilmington, Del.

[*] Notice: The portion of the term of this patent subsequent to Dec. 24, 2008 has been disclaimed.

[21] Appl. No.: 802,587

[22] Filed: Dec. 5, 1991

[51] Int. Cl.⁵ .............................................. B01D 29/11
[52] U.S. Cl. ........................................ 210/85; 210/91; 210/232; 210/452; 210/453; 55/378
[58] Field of Search ....................... 55/378; 210/85, 91, 210/232, 238, 445, 443, 442, 450, 451, 452, 453

[56] References Cited

U.S. PATENT DOCUMENTS

| | | | |
|---|---|---|---|
| 4,133,769 | 1/1979 | Morgan, Jr. | 55/378 |
| 4,867,771 | 9/1989 | Brennecke et al. | 55/378 |
| 5,039,410 | 8/1991 | Gershenson | 210/445 |
| 5,064,455 | 11/1991 | Lackner | 55/378 |
| 5,075,004 | 12/1991 | Gershenson et al. | 210/453 |

Primary Examiner—Robert A. Dawson
Assistant Examiner—W. L. Millard
Attorney, Agent, or Firm—Richard T. Laughlin; Joshua J. Ward

[57] ABSTRACT

A filter apparatus having an identification and filter subassembly. The identification and filter subassembly includes a bag filter and a top end collar and a radial identification tag. The collar has a lower portion fixedly connected to the bag filter, and has a middle portion to be supported within a vessel, and has a top lip portion to engage a cover plate of the vessel. The collar has a pivotable web portion disposed between the middle portion and the top lip portion, and has an inner surface with a groove having sidewalls. The identification tag is cantilevered radially outwardly from the top lip portion for reading information disposed thereon from the exterior of the vessel.

12 Claims, 3 Drawing Sheets

FILTER IDENTIFICATION DEVICE

The invention relates to a filter identification device and in particular the invention relates to a filter bag identification ring seal having a pivotable lip portion with a cantilever tag.

RELATED APPLICATIONS

Related applications, which are assigned to the same assignee as this application, are application Ser. No. 502,714, filed Apr. 02, 1990, entitled "Filter Apparatus Having A Bag With A Gasket" and application Ser. No. 601,536, filed Oct. 23, 1990, entitled "Filter Bag Seal".

BACKGROUND OF THE INVENTION

The prior art filter apparatus having a bag with a resilient gasket is described in U.S. Pat. No. 4,460,468, issued Jul. 17, 1984. Related patents include U.S. Pat. Nos. 3,771,664, issued Nov. 13, 1973, 4,133,769, issued Jan. 9, 1979, 4,204,966, issued May 27, 1980, 4,259,188, issued Mar. 31, 1981, 4,285,814, issued Aug. 25, 1981, 4,419,240, issued Dec. 6, 1983, 4,460,468, issued Jul. 17, 1984, 4,490,253, issued Dec. 25, 1984, and 4,669,167, issued Jun. 2, 1987.

The prior art filter apparatus having a bag with a resilient gasket includes a housing, a cover plate, and a bag filter subassembly. The bag filter subassembly has a filter bag and a rubber seal member. The seal member has a web portion and a peripheral head portion for forming a seal between the housing and the cover plate, the rubber seal being attached to the bag filter at its open end by an adhesive or heat seal.

One problem with the prior art filter apparatus is that there is no way to tell if the seal member and the filter bag are in place, except by removing the cover plate.

SUMMARY OF THE INVENTION

According to the present invention, a filter apparatus is provided. The filter apparatus comprises an enclosure subassembly having a housing and a cover plate and a bag filter subassembly, the bag filter subassembly having a filter bag and a collar and an identification portion, the collar having a lower portion attached to the filter bag and having a middle portion fixedly connected to the lower portion and having a top lip portion pivotally connected to the middle portion, the middle portion and top lip portion forming an inner groove, and the identification portion having a fixed end portion fixedly connected to the top lip portion.

By using the cantilever identification tag, one can see that the seal ring and filter bag are in place, thereby avoiding the need to remove the cover plate.

The foregoing and other objects, features and advantages will be apparent from the following description of the preferred embodiment of the invention as illustrated in the accompanying drawings.

DESCRIPTION OF THE PREFERRED EMBODIMENT

Figure 1:
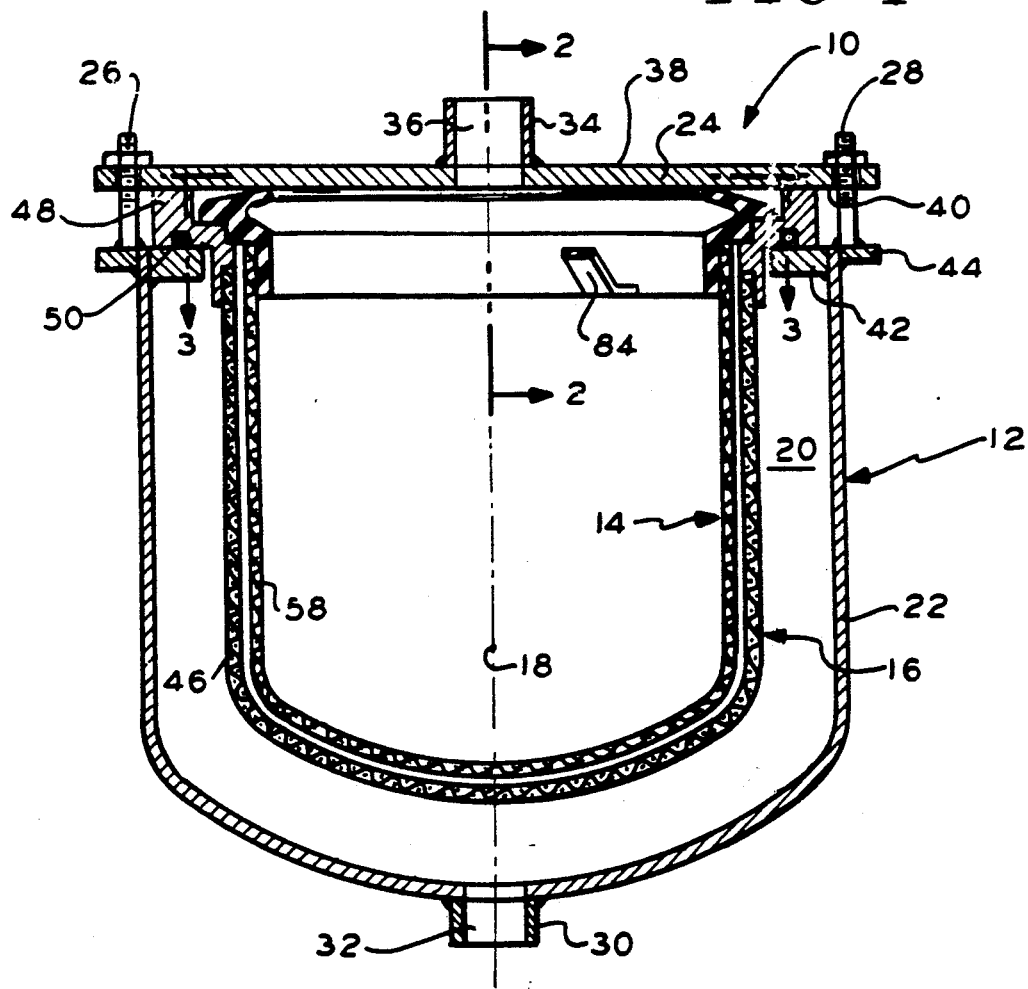
FIG. 1 is a vertical section view of a filter apparatus according to the invention.

As shown in FIG. 1, a pressure filtration apparatus 10 is provided. Apparatus 10 includes an enclosure subassembly 12, a basket subassembly 16, and a filter bag assembly 14, which are coaxial about an axis 18. Enclosure subassembly 12 is a pressure vessel.

Enclosure subassembly 12, which encloses a chamber 20, has a housing 22, and a cover plate 24, which has a plurality of hold-down bolts 26,28 with nuts. Housing 22 also has an outlet pipe 30 with an outlet passage 32 from chamber 20. Cover plate 24 has an inlet pipe 34 with an inlet passage 36 to chamber 20. Cover plate 24 has an upper surface 38 and a lower surface 40.

Housing 22 also has an inner flange or support bracket 42, which supports basket subassembly 16, and has an outer flange 44, which supports bolts 26, 28.

Figure 2:
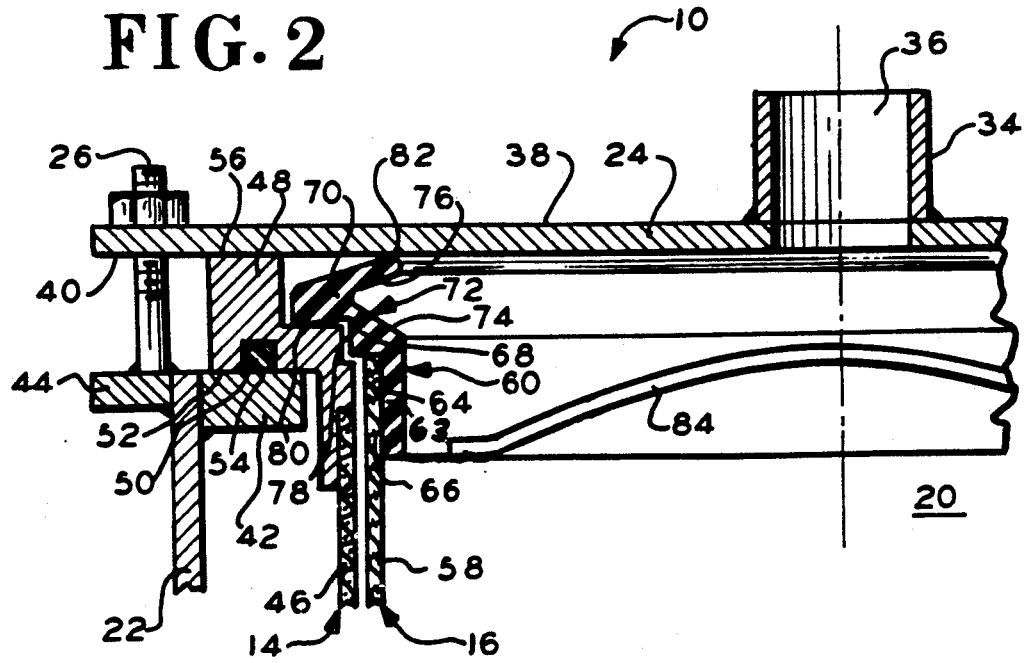
FIG. 2 is a portion of FIG. 1.

As shown in FIG. 2, basket subassembly 16 has a basket portion 46, and has an annular member 48, which has an O-ring 50 of rubber-like material. Annular member 48 has an underside surface 52, which has a groove 54 that receives O-ring 50. Annular member 48 is fixedly connected to and supports basket portion 46. Annular member 48 also has an upper bearing surface 56. Annular member 48 bears on O-ring 50, which bears on inner flange 42.

Filter bag assembly 14 has a filter bag 58 and a seal ring or integral collar 60 and a cantilever portion or tag 62. Collar 60 and tag 62 are preferably made of a molded thermoplastic rubber manufactured by Monsanto. Collar 60 has a lower flange portion 63, which has a ring-shaped one-sided recess 64 that receives a top end portion 66 of filter bag 58. Collar 60 also has a middle portion 68 and a top lip portion 70. Bag 58 is attached to portion 63 by sewing stitches and/or by heat sealing. Middle portion 68 and top lip portion 70 together form a circumferential cavity or inner groove 72. Groove 72 has a slanted lower sidewall 74 and a slanted upper sidewall 76. Top lip portion 70 and middle portion 68 have a pivotable web portion 78 therebetween, for pivoting of portion 70 relative to portion 68. Top lip portion 70 forms a bottom, ring-shaped sealing area 80 with portion 48, and forms a top ring-shaped sealing area 82 with cover plate 24, due to internal pressure forces on sidewalls 74, 76.

Collar 60 also has a handle 84 for lifting bag 58 from chamber 20. Handle 84 has flared end portions 86, 88, each of which is integrally molded with collar 60 and is connected to lower portion 62.

Collar 60 is retained between cover plate 24 and annular member 48. Liquid pressure inside bag 58 exerts a force on each of the sidewalls 74 and 76. Such forces flex lip portion 70 and cause the formation of a substantially leak-proof sealing between lip portion 70 and cover plate 24. A lever-type action about the web portion 78 causes a seal area 80 between the underside of lip portion to an annular member 48 and causes a seal area 82 between the top of lip portion 70 and cover plate 24. The higher the internal pressure, the higher is the sealing force exerted on cover plate 24 and on annular member 48.

Handle 84 curves upwardly away from its end portions 86, 88. Handle 84 at the center portion, between end portions 86, 88, is relatively close to the top of collar 60, and near to top of basket member 48, so that handle 84 is not normally submerged in liquid. Thus, handle 84 facilitates removal of bag 58.

Identification tag 62 has a fixed end portion 90, a length 92, a width 94 and a thickness 96. In one prototype, length 92 is about one and three-quarters inches, or about 70 millimeters; width 94 is about three-quarters of an inch, or about 17 millimeters; and thickness 96 is about one-sixteenth inch, or about 2 millimeters. Thickness 96 at fixed portion 90 is less than the thickness of the adjoining top lip portion 70 of collar 60.

Figure 4:
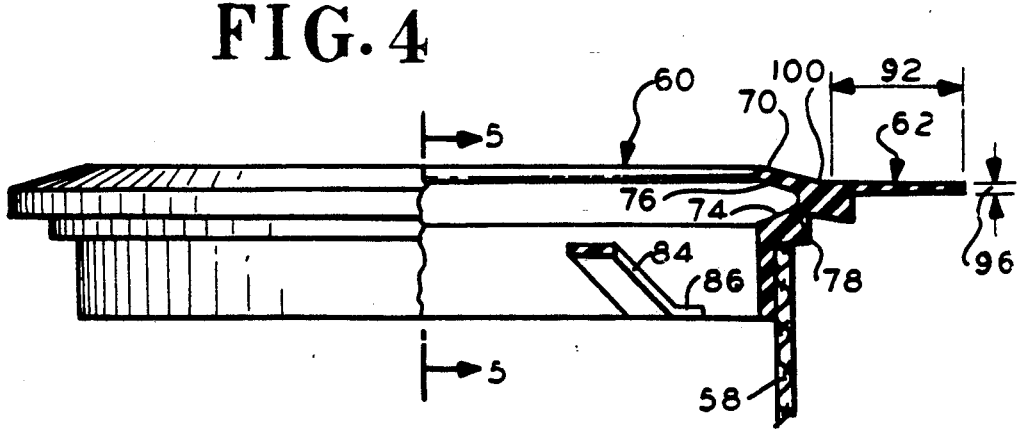
FIG. 4 is a section view as taken along the line 4—4 of FIG. 3.
Figure 3:
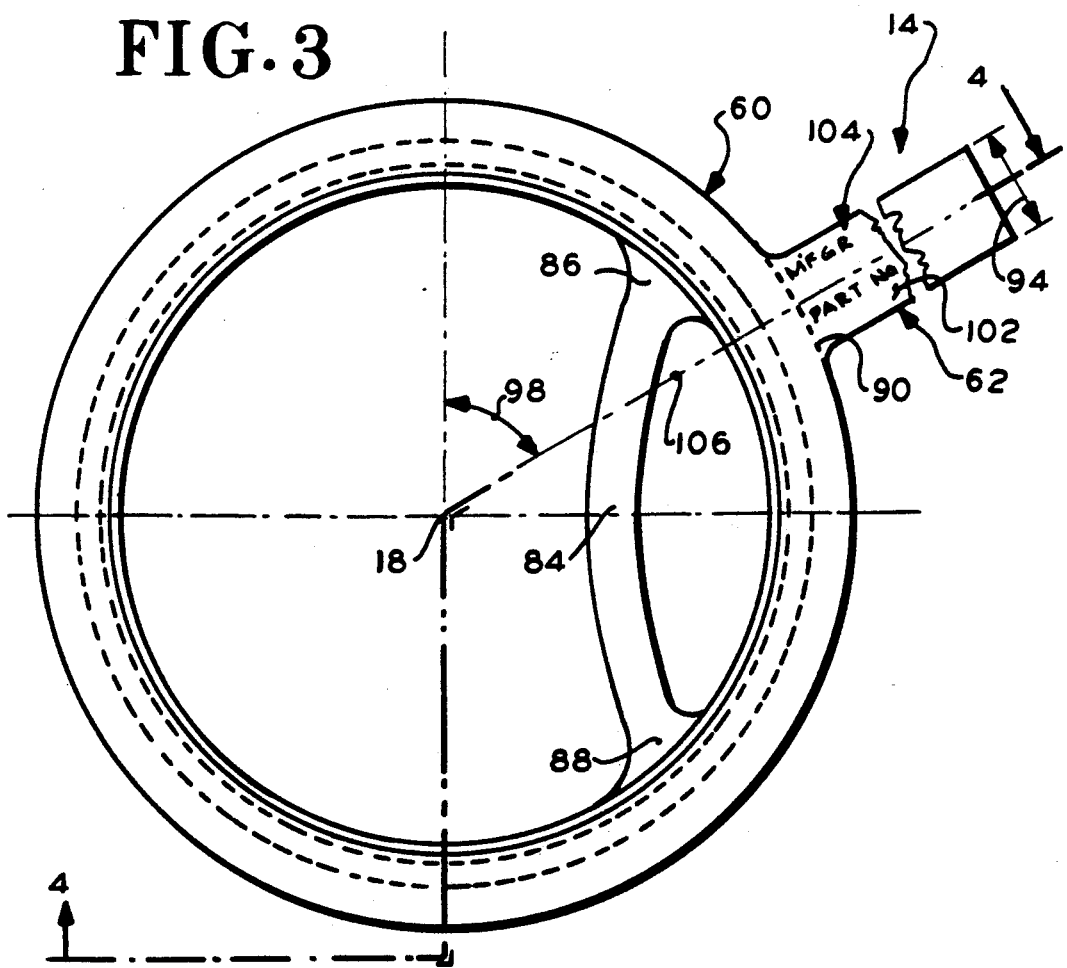
FIG. 3 is a plan section view as taken along the line 3—3 of FIG. 1.
Figure 5:
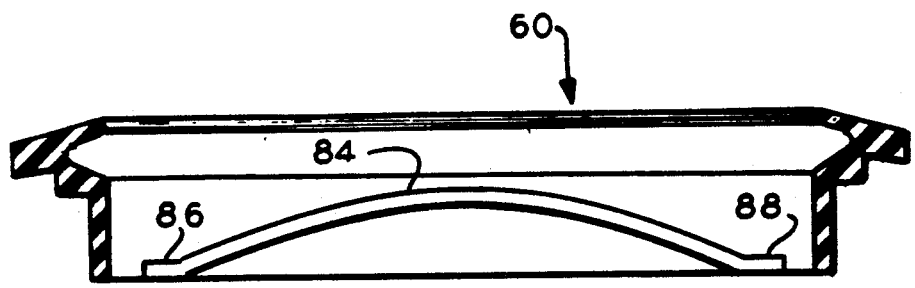
FIG. 5 is a section view as taken along the line 5—5 of FIG. 4.

The tag 62 preferably has a plan angle of about sixty degrees, or has a 2 o'clock position as shown in FIG. 4. The tag 62 also has a section 100 which can correspond to the angle of the adjoining top lip portion 70 on collar 60. Tag 62 also has an upper face 102, which has writing or indicia 104, marked or formal thereon. Tag 62 has a reference line or axis 106, about which width 94 is equidistantly or symmetrically disposed.

In one embodiment, the tag can have applied to its surface an identification mark to indicate the type of filter. Such an identification mark can be a typical bar code for optical readers.

Figure 6:
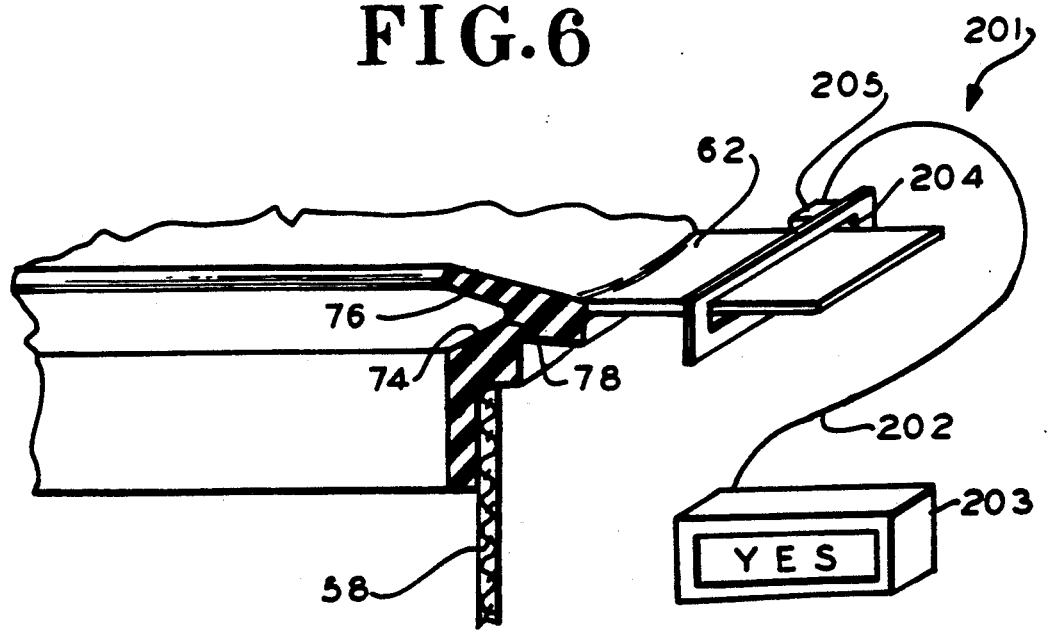
FIG. 6 is a partial section of another embodiment showing a microswitch assembly.

In another embodiment of the invention as shown in FIG. 6, an assembly can be utilized in cooperation with the tag in order to control the flow through the filter or to indicated on a control panel that the filter is in place. In one configuration a microswitch assembly generally indicated at 201 is mounted externally on the filter assembly and electrically connected such as through wire 202 to a remote indicator such as a display panel 203 or, alternately to a pump system (not shown) for controlling the flow of liquid through the filtering system. The microswitch assembly has a receiving slot 204 and contact arrangement such as a microswitch 205. When the free end of the tag is within the slot, the contact sends an electrical impulse to the display panel 203 or, alternatively, to the pump system for allowing the pump system to be operative.

The advantages of apparatus 10 with its identification tag 62 are indicated hereafter.

A) Tag 62 avoids the need of removing the cover plate 24 each time it is necessary to determine if the filter bag 58 is disposed in the housing 22.

B) Tag 62 can show printed or embossed information on its face, which is on occasion an essential need of a user.

C) Collar 60 substantially minimizes by-pass leakage of liquid past collar 60 between cover plate 24 and filter bag 58.

D) Identification subassembly 14 is adaptable to basket subassemblies and enclosure subassemblies which are made by different manufacturers, and which have relatively slight variation in bag diameter and collar depth.

E) The tag can be utilized with an electrical assembly to indicate the proper positioning of the filter and its presents to a display or to make the pump which forces the liquid through the filter, operational.

While the invention has been described in its preferred embodiment, it is to be understood that the words which have been used are words of description rather than limitation and that changes may be made within the purview of the appended claims without departing from the true scope and spirit of the invention in its broader aspects.

For example, indicia 104 can also include information about the material, size and micron rating of filter bag 58, or information about production specifications.

As another example, one or more additional tags can be fixedly connected to ring 60 at different plan angle positions, which are similar in size to tag 62, and which contain respective added indicia.

What is claimed is:

1. A filter apparatus comprising:
an enclosure subassembly having an axis and having a housing with a top flange and having a cover plate connected to the housing;
a basket subassembly having a basket portion and having an annular ring in sealing engagement with the top flange;
an identification subassembly having a filter bag and an integral collar in sealing engagement with the annular ring and with the cover plate;
said collar having a lower portion fixedly connected to the filter bag and having a middle portion supported by the annular ring and having a top lip portion engaging the cover plate;
said collar having an inner surface with an inner groove having a lower sidewall disposed adjacent to the middle portion and having an upper sidewall disposed adjacent to the top lip portion;
said collar having a pivotable web portion disposed between the middle portion and the top lip portion;
said identification subassembly having a cantilever identification tag fixedly connected to the collar; said identification tag having a face which contains information related to the apparatus, wherein the tag is connected to indicating means for signalling the presence of the filter in place, and wherein the indicating means is a slot through which the tag passes and an electrical switch for indicating the presence of the tag in the slot.

2. The apparatus of claim 1 wherein
the collar has at least one elongated handle and a radial inner face; and
the handle having opposite end portions, each end portion having an arcuate flexible connection to the radially arranged inner face.

3. The apparatus of claim 1, wherein the tag and the collar are composed of a molded thermoplastic rubber.

4. An identification and filter subassembly for an enclosure subassembly having a cover plate comprising;
a filter bag having a top end portion of ring shape; and
a collar having a lower portion fixedly connected to the bag top end portion and having a middle portion supported by the enclosure subassembly and having a top lip portion engaging the cover plate;
said collar having an inner surface with an inner groove, said groove having a lower sidewall disposed adjacent to the middle portion and having an upper sidewall disposed adjacent to the top lip portion;
said collar having a pivotable web portion disposed between the middle portion and the top lip portion;
said top lip portion having an identification tag cantilevered from the top lip portion;
said identification tag having a radially inner portion fixedly connected to the top lip portion;
said identification tag having an upper face;
said upper face having indicia for showing information related to the identification and filter subassembly, wherein the tag is connected to indicating means for signalling the presence of the filter in place, and wherein the indicating means is a slot through which the tag passes and an electrical switch for indicating the presence of the tag in the slot.

5. A filter apparatus comprising:
an enclosure subassembly having an axis and having a housing with a top flange and having a cover plate connected to the housing;
a basket subassembly having a basket portion and having an annular ring in sealing engagement with the top flange; and
an identification subassembly having a filter bag and having a collar in sealing engagement with the annular ring and with the cover plate and having an identification tag cantilevered radially outwardly from and fixedly connected to the collar, wherein the tag is connected to indicating means for signalling the presence of the filter in place.

6. The apparatus of claim 5 wherein
the collar has at least one elongated handle and a radial inner face; and
the handle having opposite end portions, each end portion having an arcuate flexible connection to the radially arranged inner face.

7. The apparatus of claim 5, wherein the tag and the collar are composed of a molded thermoplastic rubber.

8. The apparatus of claim 5, wherein said collar having a lower portion fixedly connected to the filter bag and having a middle portion supported by the annular ring and having a top lip portion engaging the cover plate; said collar having an inner surface with an inner groove having a lower sidewall disposed adjacent to the middle portion and having an upper sidewall disposed adjacent to the top lip portion; said collar having a pivotable web portion disposed adjacent to the top lip portion; said collar having a pivotable web portion disposed between the middle portion and the top lip portion; and said identification tag having a face which contains information related to the apparatus.

9. A filter apparatus comprising:
an enclosure subassembly having an axis and having a housing with a top flange and having a cover plate connected to the housing;
a basket subassembly having a basket portion and having an annular ring in sealing engagement with the top flange; and
an identification subassembly having a filter bag and having a collar in sealing engagement with the annular ring and with the cover plate and having an identification tag cantilevered radially outwardly from and fixedly connected to the collar, wherein the tag is connected to indicating means for signalling the presence of the filter in place, and, wherein the indicating means is a slot through which the tag passes and an electrical switch for indicating the presence of the tag in the slot.

10. The apparatus of claim 9 wherein
the collar has at least one elongated handle and a radial inner face; and
the handle having opposite end portions, each end portion having an arcuate flexible connection to the radially arranged inner face.

11. The apparatus of claim 9, wherein the tag and the collar are composed of a molded thermoplastic rubber.

12. The filter as defined in claim 9, wherein the indicating means includes a display panel for visually indicating the presence of the filter.

* * * * *